United States Patent Office
3,362,904
Patented Jan. 9, 1968

3,362,904
N-PARAFFIN SEPARATION WITH ERIONITE
Maurice G. Lorenz, North Plainfield, N.J., assignor to Esso Research and Engineering Company, a corporation of Delaware
No Drawing. Filed Sept. 24, 1965, Ser. No. 490,067
11 Claims. (Cl. 208—310)

ABSTRACT OF THE DISCLOSURE

A process for desorbing normal paraffins from erionite wherein steam is employed as the displacing agent. The use of steam has no adverse affect on the sieve life or capacity. The effect of steam on both the erionite sieve and the Linde type 5A sieve is compared.

This case relates to an improved molecular sieve separation process. More particularly, this case relates to a molecular sieve separation process in which the molecular sieve utilized, erionite, may be desorbed by means of a sweep with steam.

It has been well known for a long period of time that certain zeolites, both naturally occurring and synthetic, have the ability to separate normal from branched-chain, cyclic and aromatic hydrocarbons. The zeolites have crystal patterns such as deformed structures containing large numbers of small cavities interconnected by a number of still smaller holes or pores, the latter being of exceptionally uniform size. Only molecules small enough to enter the pores can be adsorbed, though all molecules even though small enough to enter the pores will not be adsorbed. An affinity of the molecule for the adsorbent must be present. In order to separate normal paraffins from mixtures including at least one constituent from the group consisting of cyclic compounds, aromatic compounds and isocompounds, the molecular sieve will have to have pore sizes which vary in diameter from 3 to 6 A. units. Molecular sieves which have larger pore openings such as from 8 to 15 A. units may be utilized to separate aromatic compounds from mixtures in which they are contained.

The scientific and patent literature contain numerous references to the adsorbing action of natural and synthetic zeolites. Among the natural zeolites having this sieve property, the ability to separate normal paraffins from admixtures, are chabazites, analcite and erionite. It is also well known to use synthetic zeolites for the separation of normal paraffins from admixtures. Synthetic zeolites used for this purpose are known as type A sieves. Especially effective type A sieves for this separation are the type A sieves from the alkaline earth series. In particular, calcium type A is extremely effective for this purpose. These type A adsorbents are described in U.S. Patent 2,882,243. The type X adsorbents which are used to separate aromatics from admixtures are described generally in U.S. Patent 2,882,244.

The separation of normal from branched-chain or aromatic hydrocarbons or mixtures either for the purpose of enriching the mixtures in the branched-chain, cyclic or aromatic compounds or for isolating and recovering normal paraffins has become increasingly important to industry. Thus, in the preparation of jet and diesel fuels, the presence of normal paraffins degrades the freezing point rating. On the other hand, in the manufacturing of synthetic detergents such as alkyl aryl sulfonates, a straight-chain alkyl substituent makes for better detergency and biodegradable characteristics than a branched-chain constituent of the same number of carbon atoms. Such detergents can be prepared using normal paraffins or normal olefins. Numerous other examples can be cited to show the utility of a normal paraffin separation from admixtures with a least one constituent selected from the group consisting of isomeric hydrocarbons, aromatic hydrocarbons and cyclic hydrocarbons.

After the adsorption phase of the operation, the molecular sieve must then be desorbed of the material which has previously been adsorbed onto it. A great number of different means have been selected for this purpose. In U.S. Patent 3,037,338, a method is taught for desorbing molecular sieve, including erionite, by means of carbon dioxide. It is also known in the art that normal paraffins may be desorbed with lighter weight normal paraffins. Perhaps the most effective desorbing media utilized has the configuration:

wherein $R_1$, $R_2$ and $R_3$ are selected from the group consisting of hydrogen and $C_1$ to $C_5$ normal paraffins. It is also known to utilize $SO_2$, $CO_2$, etc., as a displacing agent.

However, these methods, although they have met with varying success, have presented some important disadvantages. Initially, it should be mentioned that this type of displacement is expensive since the displacing agent or media adds appreciably to the costs of recovering the adsorbed normal paraffins. Additionally, the product obtained may be contaminated by the displacing agent. Great care must be taken to see to it that substantially all the displacing agents present is removed. However, small losses of displacing agent are inevitable and this must be replaced. When using lighter normal paraffins to desorb, a substantial loss is inevitable since a very sharp fractionation of product and displacing agent is difficult to obtain. Additionally, many materials used for desorption must be compressed for recirculation.

In order to alleviate these problems, attempts have been made to desorb the synthetic molecular sieves with steam. These attempts have been totally unsuccessful since the Linde 5A molecular sieve and 13X molecular sieve deteriorate in extremely rapid fashion when they are exposed to steam. These sieves are definitely not steam stable and the presence of steam serves to collapse their structure which results in the loss of ability to adsorb material which previously could be adsorbed.

According to this invention, this problem of obtaining a steam stable molecular sieve has been solved. It has unexpectedly been discovered that erionite, and particularly an erionite in which the sodium and potassium ions have been substantially, or at least partially substituted for by $H^+$, is capable of being desorbed by steam without any loss in molecular sieve capacity. In fact, a gain in sieve capacity has on occasion been observed. Erionite is a naturally occurring molecular sieve material which has the general formula: $NaKCaAlSi_{12}O_{32} \cdot 12H_2O$. It consists of zeolitic aluminum silicate of sodium, potassium and calcium. It occurs in aggregates of orthorhombic fibrous white crystal which bears a resemblance to wool.

The advantages of this ability of erionite to be desorbed by steam are readily apparent. Initially, as mentioned above, steam desorption is much cheaper than using displacing agents such as an amine, $SO_2$ or $CO_2$. Additionally, there is little or no danger of product contamination and in all probability if some of the steam should remain with the product, there would not be any real harm done. Losses of steam are also readily tolerable since its replacement costs are minute. Replacement costs for most relatively effective displacing agents are several times as great. An incidental benefit which is gained by the use of erionite concerns the fact that catalytic activity for polymerization, isomerization and other deactivating reactions is considerably less for erionite than other molecular sieves such as Linde 5A. The hydrogen form of erionite is the preferred form since it is the most stable to steam.

With respect to operating conditions of the instant invention, these conditions are not critical and are known in the art. Either liquid or vapor phase reactions may be conducted with the erionite. However, vapor phase is preferred. The erionite may be used only to separate normal paraffins from mixtures with at least one component selected from the group consisting of isomeric hydrocarbons, cyclic hydrocarbons and aromatic hydrocarbons. The erionite has no capacity to adsorb aromatics within its pores. The temperature utilized for the adsorption may vary between 100° and 1000° F., preferably 400° to 800° F. and most preferably 500° to 750° F. The pressure during adsorption may also vary within wide ranges such as 1 to 100 p.s.i.a., preferably 10 to 50 p.s.i.a. and most preferably 15 to 50 p.s.i.a. The amount of feed per cycle should vary between .01 to 10 W/W, preferably 0.2 to 5 W/W and especially preferred 0.3 to 3.0 W/W. The displacing agent, which in this case is steam, is introduced at the rate of 0.01 to 5 W/W, preferably 0.02 to 3 W/W and most preferably 0.02 to 1 W/W/cycle based on the amount of adsorbent. Cycle times for adsorption and desorption should vary between 1 minute and 60 minutes, preferably 2 minutes to 40 minutes and most preferably 4 minutes to 25 minutes. Normal paraffins in the $C_4$–$C_{40}$ range, preferably $C_5$–$C_{20}$ and most preferably $C_5$–$C_9$ may be adsorbed.

In a preferred embodiment of the instant invention, a feedstock containing normal paraffins in a $C_5$–$C_8$ range, isoparaffins and cyclic paraffins is passing over a bed of erionite. The bed is maintained at a temperature of 500° to 800° F. and a pressure of 15 to 50 p.s.i.a. The normal paraffins are adsorbed onto the bed and the remainder of the feedstream passes out of the bed as sievate. The bed is then desorbed with steam which is introduced at a rate of 0.02 to 0.2 W/W. Cycle times for adsorption and desorption vary between 4 and 30 minutes. At the end of 200 cycles, the erionite molecular sieve has lost only a relatively small part of its original capacity. This loss is solely due to the coking tendency present in any molecular sieve process, there being essentially no permanent damage due to exposure to steam. The capacity loss due to coking is essentially fully recoverable by burning; although after this number of cycles, such regeneration would normally not yet be necessary. Capacity is here defined as the quantity of desorbate obtained each cycle of high purity, such as 95–99%. As capacity declines due to nonpermanent deactivation or coking, cycle time is gradually reduced in order to maintain constant hourly feed and product rates. As an optional feature of this invention, although not essential for its operation, the first 5 to 40% of desorbate obtained may be recycled back through the erionite molecular sieve separation zone. This is done to increase the purity of the product which is eventually obtained.

EXAMPLE 1

In this example, an attempt was made to determine the effect on erionite of prolonged exposure to steam. A fresh erionite sample was placed in an oven. Steam at 650° F. and 15 p.s.i.a. was passed over the erionite for a period of 28 days. At the end of this time, the erionite was examined by means of X-ray diffraction, and its crystallinity as measured by this technique was found to be 10% higher than before exposure to steam. The surface area of the steamed erionite was found to be 375 m.$^2$/g. by the BET method using nitrogen, whereas before steaming it had been 356 m.$^2$/g.

EXAMPLE 2

In this example, a sample of Linde type 5A molecular sieve is treated in the exact manner as the erionite is treated in Example 1. It is found by the same means of investigation that the structure of the 5 A. sieve has collapsed. It is no longer capable of separating normal paraffins from admixtures with other non-adsorbable hydrocarbons.

EXAMPLE 3

In this example, a West Texas crude stock boiling between 40° and 300° F. and containing 20% of normal paraffins, 34% of isoparaffins, 35% of cycloparaffins and 11% aromatics is passed over an erionite adsorbent in a molecular sieve separation zone. The zone is maintained at a temperature of 665° F. and a pressure of 20 p.s.i.a. The feedstock is passed through the zone at a rate of 0.7 W/W/hr. After a period of 20 minutes, the normal paraffins adsorbed onto the erionite are then desorbed with steam. Conditions are the same and steam is introduced at the rate of 0.7 W/W/cycle. The first 15% of the desorbate from each cycle is rejected for recycle to feed and the remainder collected as product. At the end of 200 cycles, the erionite sieve is still nearly as effective as it is in the initial few cycles, a loss of only 15% in n-paraffin capacity being observed. Normal paraffins with a purity of 97% is obtained at the end of 200 cycles. Regeneration by burning at 950° F. with $N_2$ containing 1/2% $O_2$ is carried out and cycling is resumed. Performance is identical to that in the initial set of cycles. This indicates that erionite is substantially steam stable. An H+ exchanged erionite is used in this example.

EXAMPLE 4

In this example, the exact conditions of Example 3 are utilized except that a 5 A. molecular sieve is used in place of the erionite molecular sieve. At the end of 200 cycles, this sieve has lost substantially all of its capacity to adsorb normal hydrocarbons. Regeneration by burning does not restore capacity. This indicates that the erionite is far more steam stable than the Linde type 5A molecular sieve.

Although this invention has been described with some degree of particularity, it is intended to be limited only by the attached claims.

What is claimed is:

1. An improved molecular sieve separation process in which normal paraffins in admixture with at least one constituent from the group consisting of isohydrocarbons, cyclic hydrocarbons and aromatics is passed over an erionite containing molecular sieve separation zone whereby the said normal paraffins are adsorbed, desorbing said normal paraffins with steam.

2. In a process for separating normal paraffins from mixtures with at least one constituent selected from the group consisting of isoparaffins, cyclic paraffins and aromatics, wherein the said mixtures are passed over an erionite containing molecular sieve separation zone wherein said normal paraffins are adsorbed and other members of the mixtures passed out of said zone as sievate, the improvement which comprises desorbing said normal paraffins with steam.

3. The process of claim 2 wherein said molecular sieve separation zone is maintained at a temperature of 300° to 800° F.

4. The process of claim 2 wherein said erionite is present in the hydrogen form.

5. The process of claim 3 wherein said steam is introduced at a rate of 0.02 to 1 W/W.

6. An improved molecular sieve separation process which comprises passing a normal paraffin containing mixture, said mixture containing at least one constituent from the group consisting of isoparaffins, cyclic paraffins and aromatics into an erionite containing molecular sieve separation zone wherein said normal paraffins are adsorbed onto said erionite, desorbing said molecular sieve with steam, continuing said adsorption-desorption for a period of at least 1000 adsorption-desorption cycles wherein substantially no permanent loss in the adsorptive capacity of said erionite is observed.

7. The process of claim 6 wherein said erionite is present in the hydrogen form.

8. An improved process for separating a normal paraffin from a hydrocarbon mixture, said mixture containing n-paraffins between $C_4$ and $C_{20}$, and containing at least one constituent from the group consisting of isoparaffins, cyclic hydrocarbons and aromatics which comprises passing said hydrocarbon mixture over a molecular sieve separation zone, said zone containing the hydrogen form of erionite whereby said normal paraffins are adsorbed onto said erionite, desorbing said erionite with steam whereby the deactivation of said erionite is minimized.

9. The process of claim 8 wherein said molecular sieve separation zone is maintained at a temperature of 500° to 800° F.

10. The process of claim 7 wherein said steam is introduced at a rate of 0.02 to 1 W/W/cycle.

11. The process of claim 8 wherein said adsorption of normal paraffins and desorption with steam is continued for at least 200 cycles.

References Cited

UNITED STATES PATENTS 2,886,508   5/1959   Hess et al. _____ 260—676

OTHER REFERENCES

Chem. Abstracts 63, 1965 (August) p. 2420(b).

Journal of Physical Chemistry 68(11), 1964, pp. 3427 to 3429.

American Mineralogist 49, January–February 1964 pp. 36 to 40.

HERBERT LEVINE, *Primary Examiner.*